(12) United States Patent
Rey (10) Patent No.: US 7,694,586 B2
(45) Date of Patent: Apr. 13, 2010

(54) DEVICE FOR MEASURING FORCE BY RESISTIVE DETECTION WITH DOUBLE WHEATSTONE BRIDGE

(75) Inventor: Patrice Rey, St. Jean de Moirans (FR)

(73) Assignee: Commissariat a l'Energie Atomique, Paris (FR)

( * ) Notice: Subject to any disclaimer, the term of this patent is extended or adjusted under 35 U.S.C. 154(b) by 10 days.

(21) Appl. No.: 11/908,476

(22) PCT Filed: Mar. 13, 2006

(86) PCT No.: PCT/FR2006/000550

§ 371 (c)(1), (2), (4) Date: Nov. 30, 2007

(87) PCT Pub. No.: WO2006/097613

PCT Pub. Date: Sep. 21, 2006

(65) Prior Publication Data

US 2008/0276726 A1 Nov. 13, 2008

(30) Foreign Application Priority Data

Mar. 17, 2005 (FR) .................................. 0502649

(51) Int. Cl.
*G01L 5/16* (2006.01)
(52) U.S. Cl. .................................................. 73/862.042
(58) Field of Classification Search ................................
73/862.041–862.045, 862.381, 862.391,
73/862.451, 862.471, 862.621
See application file for complete search history.

(56) References Cited

U.S. PATENT DOCUMENTS

| | | | |
|---|---|---|---|
| 4,530,244 A | 7/1985 | Starr | |
| 4,745,812 A | 5/1988 | Amazeen et al. | |
| 5,259,248 A | 11/1993 | Ugai et al. | |
| 6,289,738 B1 | 9/2001 | Zabler et al. | |
| 6,422,088 B1* | 7/2002 | Oba et al. | 73/754 |
| 6,666,079 B2* | 12/2003 | Poulbot et al. | 73/146 |
| 7,010,984 B2* | 3/2006 | Krog et al. | 73/716 |
| 7,015,706 B2* | 3/2006 | Hattori et al. | 324/725 |
| 2003/0056579 A1* | 3/2003 | Poulbot et al. | 73/146 |
| 2004/0164753 A1 | 8/2004 | Hettori et al. | |

(Continued)

FOREIGN PATENT DOCUMENTS

DE 40 12 829 A1 10/1991

(Continued)

OTHER PUBLICATIONS

PCT International Preliminary Report, English Translation, Feb. 20, 2007.

(Continued)

*Primary Examiner*—Lisa M Caputo
*Assistant Examiner*—Freddie Kirkland, III
(74) *Attorney, Agent, or Firm*—Brinks Hofer Gilson & Lione (57) ABSTRACT

A device for measuring force by resistive detection includes a double Wheatstone bridge having at least eight resistive gauges arranged on a membrane where each of the Wheatstone bridges are respectively arranged on disjointed portions of the membrane, and two resistive gauges of at least one Wheatstone bridge are reside on a non-deformable area of the membrane.

9 Claims, 5 Drawing Sheets

U.S. PATENT DOCUMENTS

| | | |
|---|---|---|
| 2005/0011270 A1 | 1/2005 | Krog et al. |
| 2007/0089536 A1* | 4/2007 | Morimoto .............. 73/862.045 |
| 2008/0148836 A1* | 6/2008 | Rey et al. ..................... 73/146 |
| 2008/0210022 A1* | 9/2008 | Rey et al. .............. 73/862.621 |

FOREIGN PATENT DOCUMENTS

| | | |
|---|---|---|
| EP | 1 275 949 A1 | 1/2003 |
| FR | 2 784 745 | 4/2000 |
| JP | 2001-272293 | 10/2001 |

OTHER PUBLICATIONS

PCT International Search Report.

PCT Request in French.

PCT Preliminary Examination Report in French.

PCT/IB/306 form in French.

*Termpoon Kovattana of SRI International, Menlo Park, Californie 94025 - Triaxial Force Sensor, 1982, Carnahan Conference on Security Technology at the University of Kentucky, Lexington, K.Y., May 12-14, 1982.

*Yao-CT; Peckerar MC, A novel three dimensional microstructure fabrication technique for a triaxial tactile sensor array, Proceedings of the IEEE Micro Robots and Teleoperators Workshop. An investigation of Micromechanical Structures, Actuators and Sensors (Cat N°87th 0204-8), IEEE, New York, USA, 1987, p4/1- 4/6.

* cited by examiner

DEVICE FOR MEASURING FORCE BY RESISTIVE DETECTION WITH DOUBLE WHEATSTONE BRIDGE

PRIORITY CLAIM

This application is a U.S. nationalization of PCT Application No. PCT/FR2006/000550, filed Mar. 13, 2006, and claims priority to French Patent Application No. 0502649, filed Mar. 17, 2005.

TECHNICAL FIELD

The present invention concerns a device for measuring force by resistive detection with a double Wheatstone bridge.

It also concerns a method for fabricating such a measuring device.

BACKGROUND

Generally speaking, the present invention concerns the field of sensors of all types of force (force, pressure, moment or angular or linear acceleration) using resistive gauges disposed in two Wheatstone bridges oriented in two different directions.

This type of force sensor can be integrated into any system in which it is required to measure a force (pneumatic, joystick for video games, etc.) or an acceleration (air bag triggering in an automobile, pacemaker, etc.).

A prior art force sensor is described in particular in the document U.S. Pat. No. 4,745,812.

That sensor produced by microtechnology techniques includes piezoresistive detection elements disposed in a double Wheatstone bridge in a plane of a deformable support. These gauges are arranged in two perpendicular directions to detect the components in space of the force applied to the deformable support.

The imbalance of a first Wheatstone bridge, obtained by interconnecting four gauges aligned in a first direction, is proportional to the component of the force in that first direction. The imbalance of a second Wheatstone bridge, obtained by interconnecting four gauges aligned in a second direction, is proportional to the component of the force in that second direction. The common mode of the two bridges is proportional to the component of the applied force in a direction perpendicular to the plane of the deformable support.

During the production of the structure of such a sensor by microtechnology means, the interconnection of the Wheatstone bridges necessitates producing insulated crossovers of the conductive tracks. In practice, these insulative crossovers are obtained by stacking two metallic levels. Such stacking represents a fabrication overcost and risks of failure of the sensor with reduced efficiency.

SUMMARY

The present invention resolves the drawbacks cited above and proposes a force measuring device that is simpler to fabricate.

The present invention is directed to a force measuring device by resistive detection using a double Wheatstone bridge comprising at least eight resistive gauges placed on a deformable and substantially plane membrane and aligned in two different directions, two gauges of at least one Wheatstone bridge being placed on a non-deformable area of the membrane.

According to the invention, the resistive gauges of at least one Wheatstone bridge are disposed on a membrane portion situated on one side only of the direction of alignment of the resistive gauges of the other Wheatstone bridge so that the resistive gauges of each of the Wheatstone bridges are disposed on respective separate membrane portions.

Thus by disposing the gauges of the same Wheatstone bridge in separate membrane portions, it is possible to effect the interconnection of the gauges of each bridge without necessitating the crossing over of the conductive tracks.

The interconnection of the gauges of the Wheatstone bridges can therefore be obtained with a single level of conductive material. Fabrication costs can therefore be reduced and the efficiency of fabrication of such a measuring device is increased.

In practice, to obtain this arrangement of the gauges on a deformable membrane, and to maintain the alignment of the gauges in a direction in the plane of the membrane, at least two gauges of a bridge are placed on a non-deformable area of the membrane.

In one embodiment of the invention, two gauges of at least one Wheatstone bridge are placed on a central area of the membrane, to which a rigid rod is fixed.

According to one practical feature of the implementation of the invention, two gauges of each of the two Wheatstone bridges are placed on a non-deformable area of the membrane.

In a second aspect, the invention also concerns a method of fabricating a measuring device as described hereinabove, that fabrication method comprising a single deposition of a conductive material to produce the interconnection of the resistive gauges of the double Wheatstone bridge.

Other features and advantages of the invention will become more apparent in the course of the following description.

BRIEF DESCRIPTION OF THE DRAWING

In the appended drawings, given by way of nonlimiting examples.

DETAILED DESCRIPTION

Figure 1:
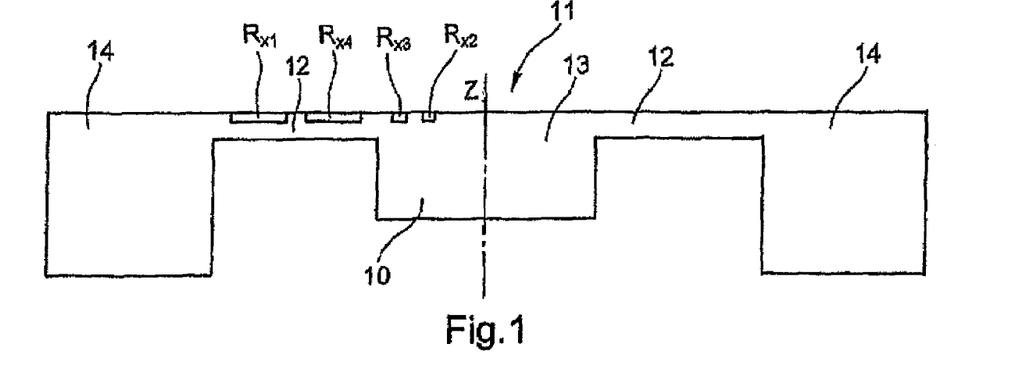
FIG. 1 is a view in cross section of a force measuring device according to a first embodiment of the invention.

A force measuring device according to a first embodiment of the invention is described first with reference to FIG. 1.

The force sensor shown has a particular structure of the "nail" type, It includes a rigid rod 10 surmounted by a head 11.

This head 11 of the measuring device includes a substantially plane deformable membrane 12 that can be deformed if the rod 10 is acted on by a force or a moment or if the loading on the complete structure by an acceleration induces a deformation of this membrane 12.

In this embodiment, the deformable membrane is a solid circular membrane, its connection with the rod 10 being effected in a non-deformable central area 13.

Of course, this deformable membrane could have a different structure, for example produced from different arms extending between the central area 13 and a peripheral area 14 of the membrane.

That peripheral area 14 includes anchor points that have a position relative to the rod 10 of the measuring device at rest and that substantially retain that position when the rod or the whole of the structure is acted on by a force.

Figure 2:
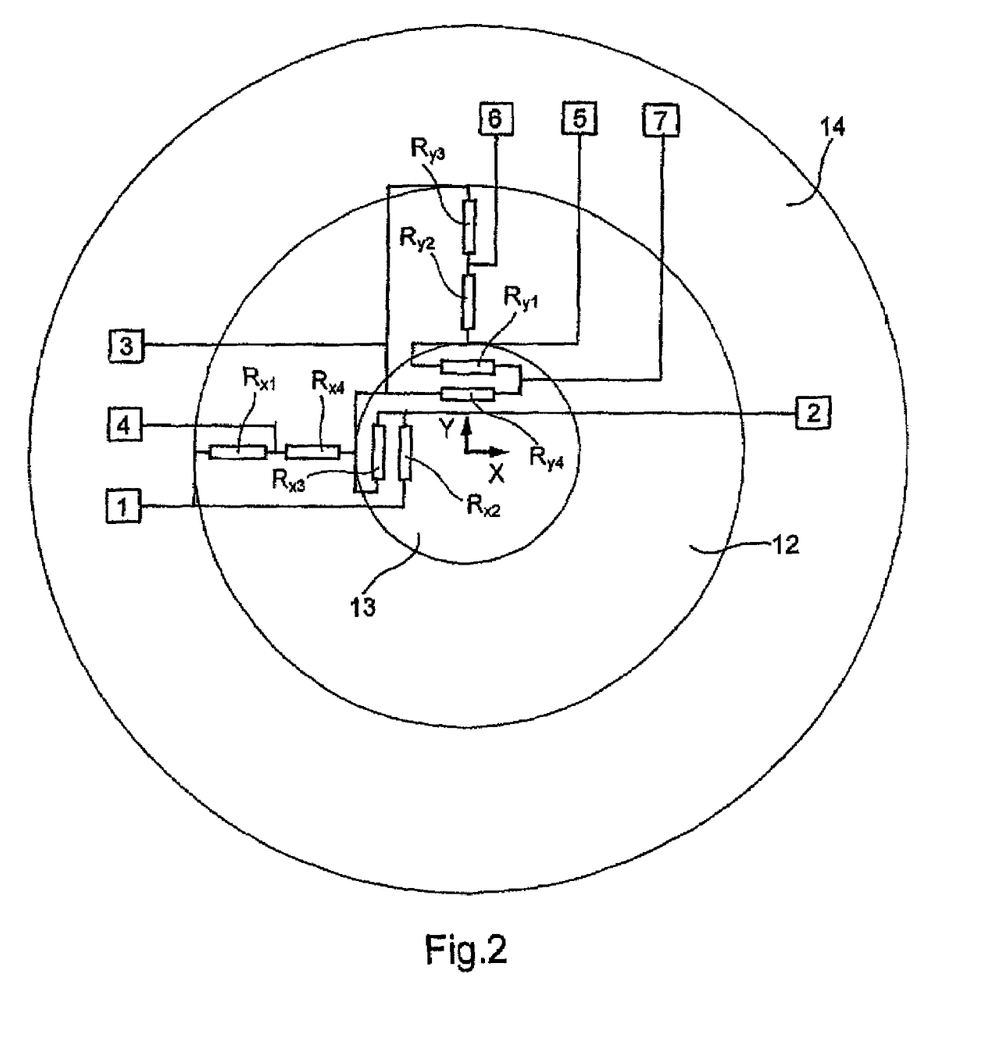
FIG. 2 is a diagrammatic top view of the force measuring device from FIG. 1 showing the double Wheatstone bridge circuit.

In the example of FIGS. 1 and 2, there is a multitude of continuous anchor points extending over the peripheral area 14 of the membrane 12.

Of course, the anchor points could also be produced in a discrete manner.

This peripheral area 14 of the membrane 12 is also non-deformable.

The membrane 12 thus includes a disc-shaped deformable area, with a non-deformable central area 13. It could equally consist of separate disc sectors.

The deformable membrane 12 includes measuring elements that here consist of eight piezoresistive gauges arranged as a double Wheatstone bridge.

In this embodiment, the piezoresistive gauges are aligned four by four in two different directions, and here in two perpendicular directions in the plane of the deformable membrane 12.

Figure 3:
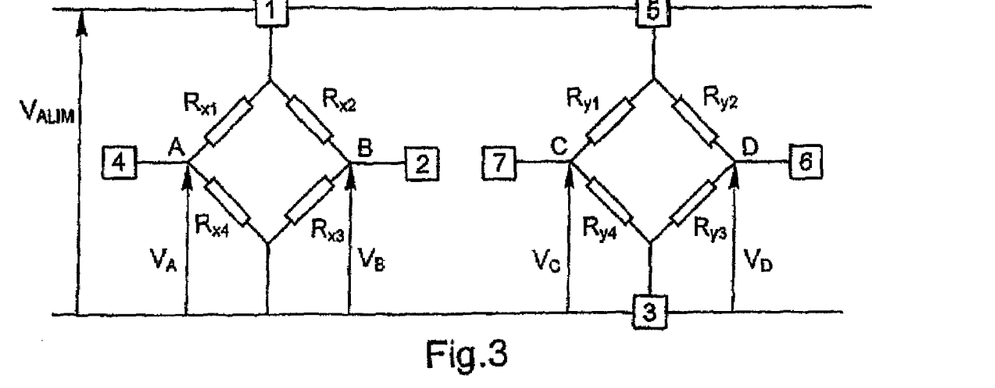
FIG. 3 is an electrical circuit diagram showing the interconnection of the gauges in a double Wheatstone bridge of the force measuring device from FIG. 1.

In particular, for four first gauges $R_{x1}$, $R_{x2}$, $R_{x3}$, $R_{x4}$ are aligned with a first direction X of the plane of the membrane 12 and connected in a Wheatstone bridge circuit as shown in FIG. 3. The imbalance of this Wheatstone bridge, as measured by the voltage difference $V_B-V_A$, is proportional to the component of the force or the acceleration in the direction X.

Similarly, four gauges $R_{y1}$, $R_{y2}$, $R_{y3}$, $R_{y4}$ are aligned in a second direction Y, perpendicular to the direction X. As shown in FIG. 3, these gauges are connected in a Wheatstone bridge circuit so that the imbalance of the bridge, represented by the voltage difference $V_D-V_C$, is proportional to the component of the force or the acceleration in this direction Y.

The common mode of the two Wheatstone bridges, represented by the voltage difference $(V_A+V_B)-(V_C+V_D)$, is proportional to the component of the force or the acceleration in the direction Z perpendicular to the plane of the membrane 12.

The resistive gauges associated with each Wheatstone bridge are disposed on respective separate membrane portions 12, i.e. the plane of the membrane can be partitioned so that the piezoresistive gauges of each bridge belong to separate portions of the partition.

It is thus possible to make the connections of the various piezoresistive gauges, shown in FIG. 2 by the various straight lines, independently, without the conductors crossing over.

In this embodiment, the resistive gauges of each Wheatstone bridge are disposed on a membrane portion situated on one side only of the direction of alignment of the resistive gauges of the other Wheatstone bridge.

For reasons connected with the dimensions of the measuring device, the Applicant has found that it is possible to dispose at least two gauges of each of the Wheatstone bridges on a non-deformable area of the membrane 12.

In this embodiment, two gauges $R_{x2}$, $R_{x3}$ and $R_{y1}$, $R_{y4}$ of each of the Wheatstone bridges are placed on the central area 13 of the membrane 12, i.e. the central area attached to the rigid rod 10.

In this embodiment in which the resistive gauges have an elongate parallelepiped shape and thus have a greater dimension in one direction, the gauges disposed on a non-deformable area of the membrane are placed transversely to the direction of alignment of the gauges of the Wheatstone bridge to which they belong. They could be oriented in any other manner, of course.

By moving some of the gauges of each of the Wheatstone bridges to a non-deformable area of the membrane in this way, a lower sensitivity of the force sensor is obtained. However, this disposition of the gauges on a non-deformable portion enables mounting of the resistive gauges of each of the bridges on separate membrane portions, without making more complex the calculation equations for the double Wheatstone bridge for measuring the intensity and the orientation of the force applied to the measuring device.

Other configurations for implementing the invention can be used, of course.

Figure 4:
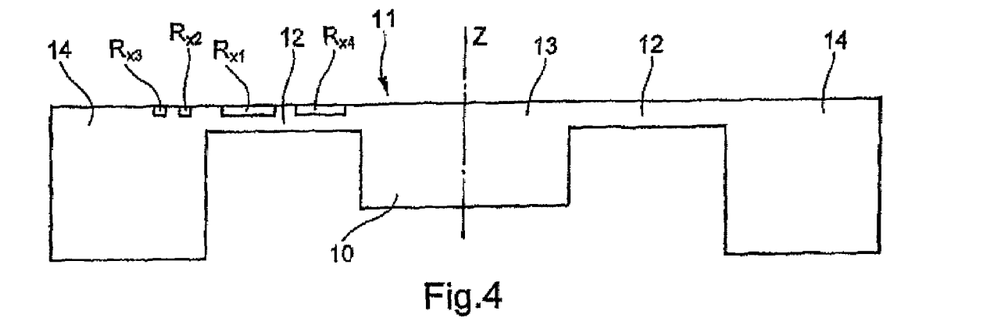
FIG. 4 is a view in cross section of a force measuring device according to a second embodiment of the invention.
Figure 5:
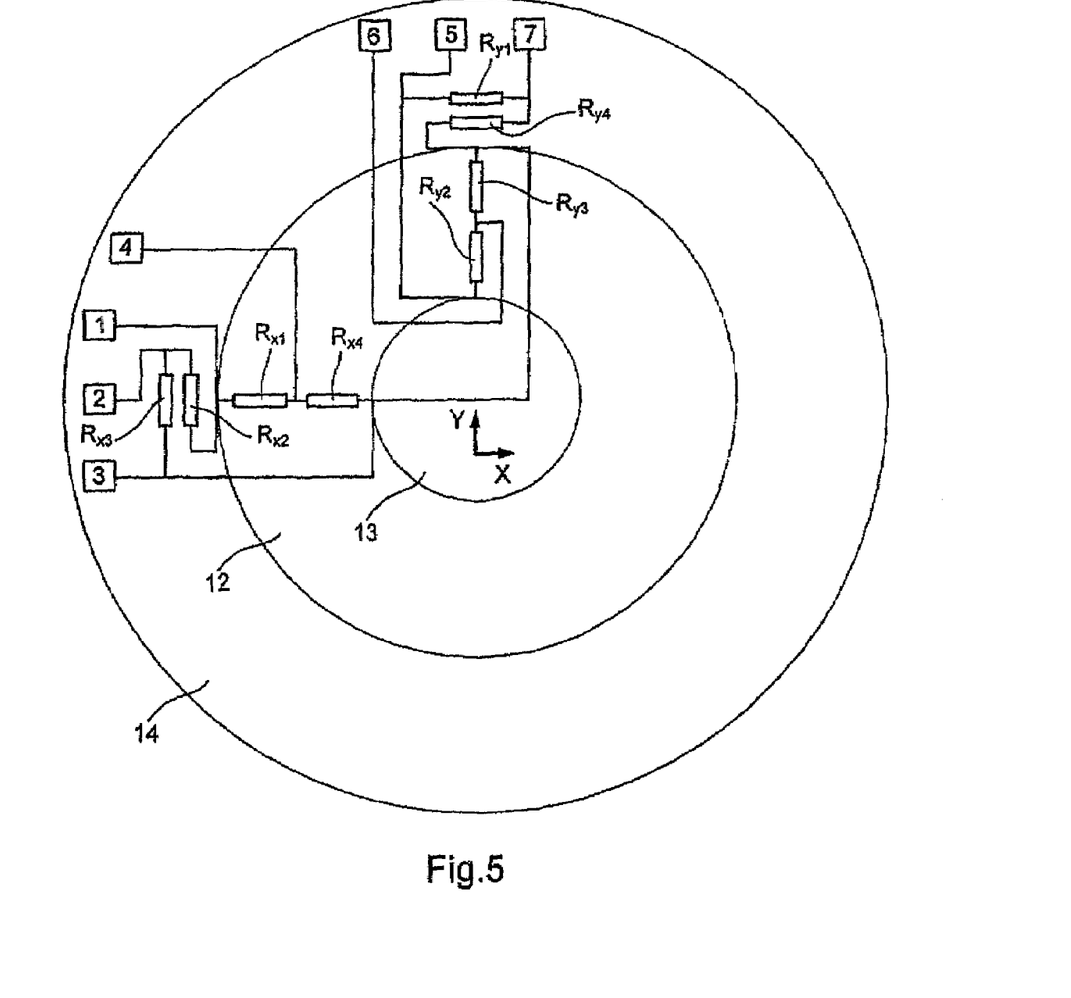
FIG. 5 is a diagrammatic top view showing the double Wheatstone bridge circuit of the measuring device from FIG. 4.

As shown in FIGS. 4 and 5, the gauges of each of the Wheatstone bridges can be placed on the peripheral area 14 of the membrane 12, that peripheral area 14 including the anchor points of the deformable membrane 12.

As in the preceding embodiment, the resistive gauges of the Wheatstone bridges are disposed on a membrane portion situated on one side only of the direction of alignment of the resistive gauges of the other Wheatstone bridge.

This disposition of the gauges on separate membrane portions enables the interconnection of the various double Wheatstone bridge resistive gauges to be effected without necessitating crossing over of the connections.

The double Wheatstone bridge arrangement of the gauges shown in FIG. 5 is identical to that shown in FIG. 3 and described hereinabove with reference to the preceding embodiment.

Figure 6:
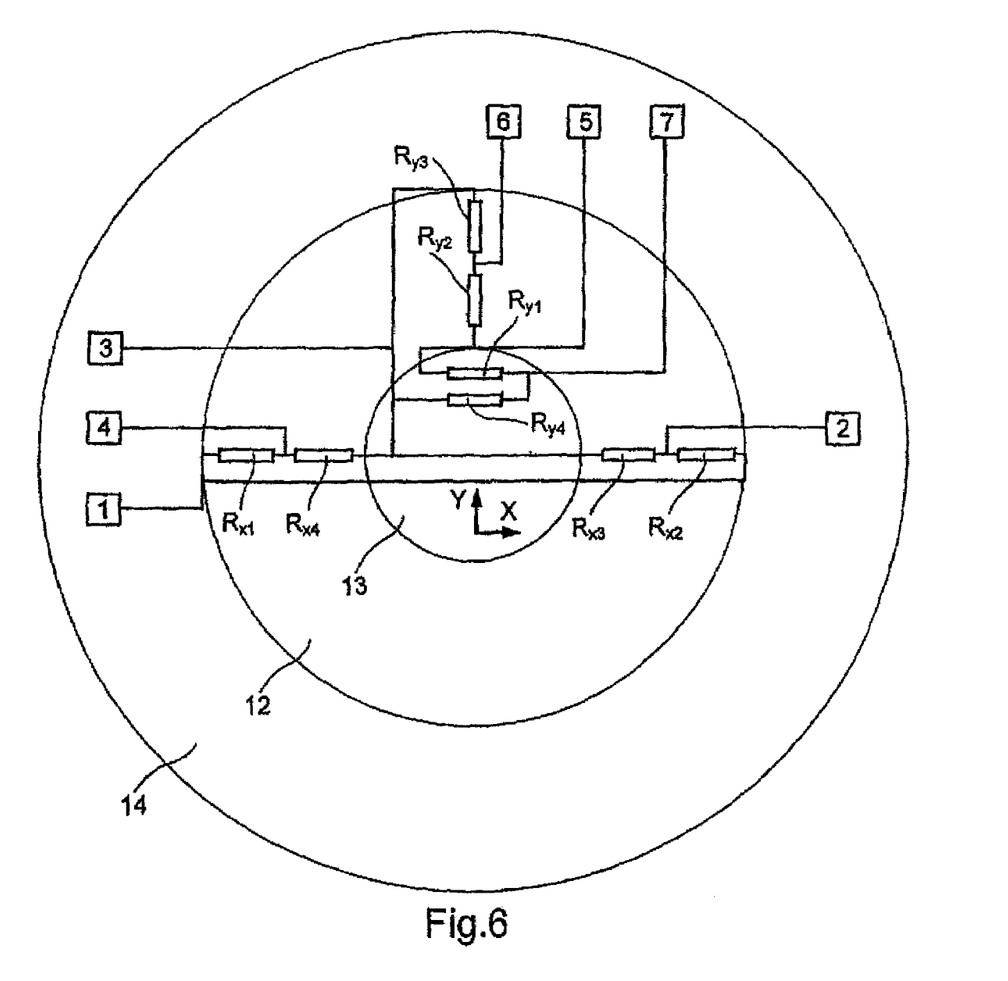
FIG. 6 is a top view showing the double Wheatstone bridge circuit of a force measuring device according to a third embodiment of the invention.

As clearly shown in FIG. 6, only the gauges of one Wheatstone bridge, here the Wheatstone bridge associated with the second direction Y, can be disposed on a membrane portion situated on one side only of the direction X of alignment of the resistive gauges of the other Wheatstone bridge.

In this embodiment, the resistive gauges of the Wheatstone bridge associated with the first direction X are disposed on either side of the second direction Y.

This type of embodiment also enables the interconnection of the various resistive gauges in a double Wheatstone bridge circuit to be effected without necessitating crossing over of the connections.

The connection of the various resistive gauges is identical to that described hereinabove with reference to FIG. 3.

A method of fabricating a force measuring device as described hereinabove is described next with reference to FIGS. 7A to 7J.

The fabrication process used in this embodiment uses microtechnology techniques.

Of course, other more conventional techniques could also be used to produce a force measuring device of the invention.

Figure 7A:
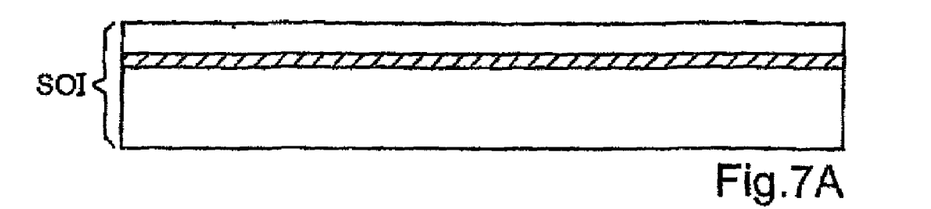
FIGS. 7A to 7J illustrate the succession of steps of a fabrication method according to one embodiment of the invention.
Figure 7B:
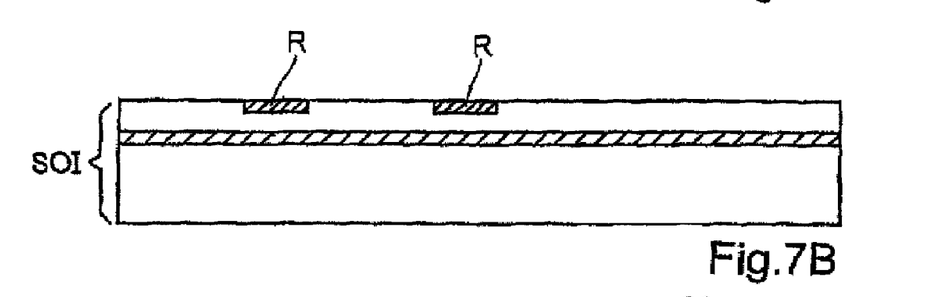

Starting from an SOI (Silicon On Insulator) substrate, as shown in FIG. 7A, resistive gauges are implanted, for example of P type in a substrate of N type. Although there is shown in FIG. 7B the implantation of only two resistive gauges R, all of the gauges necessary for implementing the measuring device are implanted at this stage, of course.

Figure 7C:
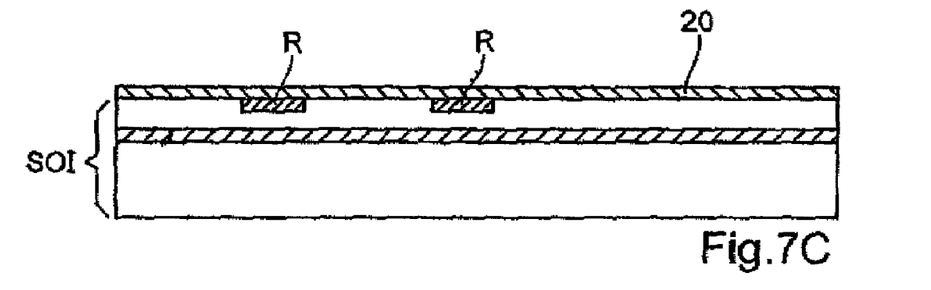

As shown in FIG. 7C, a passivating layer 20 is deposited on the SOI substrate to cover the gauges R.

Figure 7D:
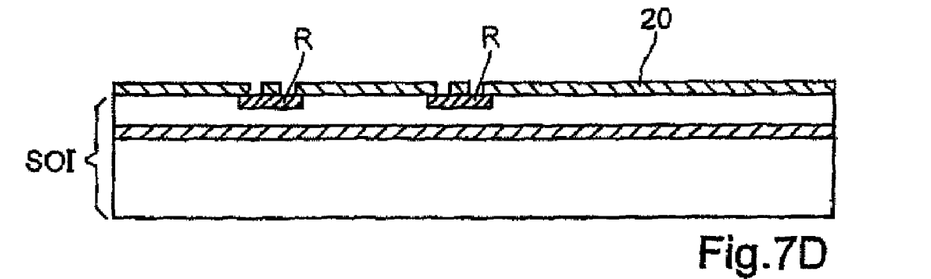

Openings are then produced in the passivation layer 20, as shown in FIG. 7D, to obtain holes providing contact with the gauges R.

Figure 7E:
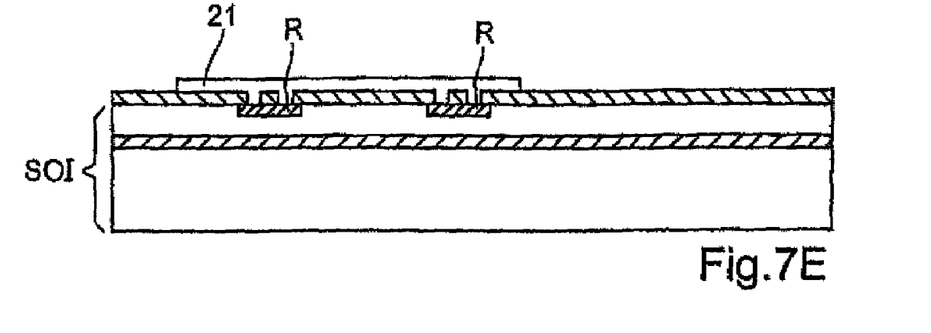

There follows the etching of the conductors providing the electrical connections and the various connections of the gauges R, and in particular the implementation and the connection of the gauges in a Wheatstone bridge circuit. This etching is effected by a deposition of conductive material 21 as shown in FIG. 7E.

The conductive material can consist of one or more layers of conductive materials such as, for example Ti—Ni—Au or Cr—Au or Ti—TiN—Au, etc.

As clearly described hereinabove, the various gauges R being disposed on separate portions of the membrane, a single deposition of conductive material 21 produces all of the connections required to produce the double Wheatstone bridge circuit with the various gauges R.

Figure 7F:
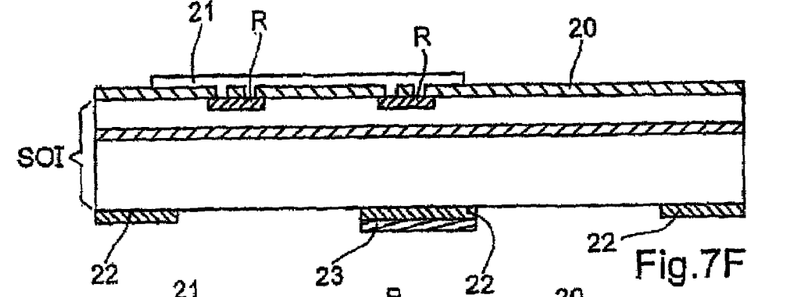

As shown clearly in FIG. 7F, a double etching mask 22, 23 is then produced on the rear face of the SOI substrate.

Figure 7G:
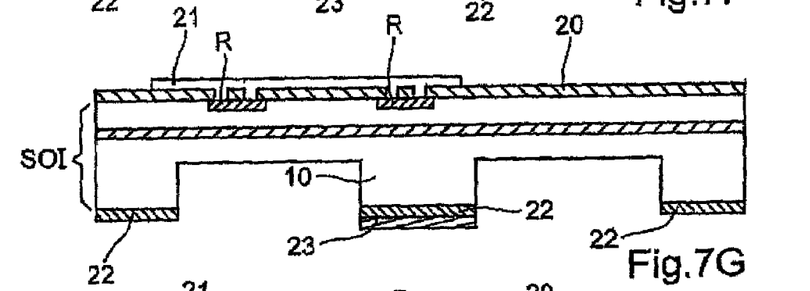

A first deep etch is effected as shown in FIG. 7G to start the shape of the measuring device, and in particular to produce the central rod 10.

Figure 7H:
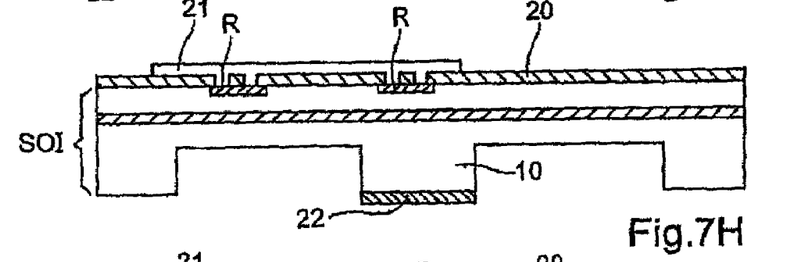
Figure 7I:
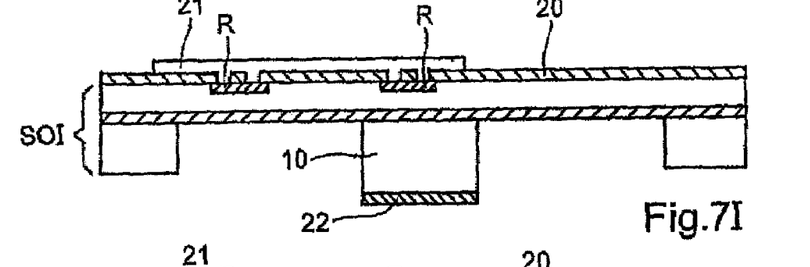

As shown in FIG. 7H, one of the etching masks 23 is eliminated before effecting as shown in FIG. 7I a second deep etch to etch the substrate as far as the insulative layer.

Figure 7J:
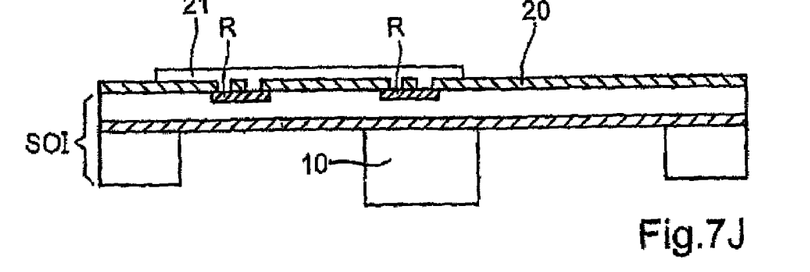

The other etching mask 22 is then eliminated as shown in FIG. 7J, the various steps of etching the rear face thus obtaining the nail-shaped structure of the measuring device of the invention.

As indicated hereinabove, in traditional techniques for producing such a device, the various portions of the structure could be produced by conventional machining and then assembled. The metallic gauges R could then be bonded to the deformable portions, the connections of the various gauges then being effected as described with reference to the steps 7D and 7E by a single deposition of conductive material to produce the conductors.

Numerous modifications can be made to the embodiment described hereinabove without departing from the scope of the invention, of course.

Thus the Wheatstone bridges could be oriented in two directions that are not perpendicular.

Other types of resistive gauge could equally be used provided that their deformation, which in principle is equal to that of the structure to which they are bonded, is reflected in a variation of resistance. Metallic gauges can be used or types of semiconductor gauge other than piezoresistive gauges.

The invention claimed is:

1. A force measuring device including first and second Wheatstone bridges on a substantially planar membrane, each Wheatstone bridge comprising at least four resistive gauges, wherein two resistive gauges of at least one Wheatstone bridge reside on a non-deformable area of the membrane, and wherein the resistive gauges of the first and second Wheatstone bridges are disposed respectively on first and second membrane portions that comprise separate membrane portions of the planar membrane, and wherein the resistive gauges on the first membrane portion are aligned along a first centerline direction and the resistive gauges on the second membrane portion are aligned along a second centerline direction.

2. The force measuring device according to claim 1, wherein the resistive gauges of the first Wheatstone bridge are disposed on the first membrane portion situated on one side only of the membrane relative to the second centerline direction of the resistive gauges of the second Wheatstone bridge.

3. The force measuring device according to claim 1, further comprising a rigid rod, wherein the two resistive gauges of the at least one Wheatstone bridge reside on a central area of the membrane attached to the rigid rod.

4. The force measuring device according to claim 1 further comprising anchor points in the membrane, wherein the two resistive gauges of the at least one Wheatstone bridge reside on a peripheral area of the membrane, and wherein the anchor points are in the peripheral area.

5. The force measuring device according to claim 1, wherein a deformable area of the membrane comprises a disc or separate disc sectors.

6. The force measuring device according to claim 1, wherein the resistive gauges are interconnected in a double Wheatstone bridge circuit by a single layer of conductive material.

7. The force measuring device according to claim 1, wherein the resistive gauges are electrically coupled by interconnects that do not cross over conductive tracks.

8. The force measuring device according to claim 1, wherein two of the resistive gauges of each of the first and second Wheatstone bridges are aligned in substantially the same direction.

9. A force measuring device including first and second Wheatstone bridges on a substantially planar membrane, each Wheatstone bridge comprising at least four resistive gauges, wherein the resistive gauges of the first and second Wheatstone bridges are disposed respectively on first and second membrane portions that comprise separate membrane portions of the planar membrane, and wherein the resistive gauges on the first membrane portion are aligned along a first centerline direction and the resistive gauges on the second membrane portion are aligned along a second centerline direction, and wherein two resistive gauges of each of the first and second Wheatstone bridges reside on a non-deformable area of the membrane.

* * * * *

UNITED STATES PATENT AND TRADEMARK OFFICE
CERTIFICATE OF CORRECTION

PATENT NO. : 7,694,586 B2  Page 1 of 1
APPLICATION NO. : 11/908476
DATED : April 13, 2010
INVENTOR(S) : Patrice Rey It is certified that error appears in the above-identified patent and that said Letters Patent is hereby corrected as shown below:

Item (54), replace "WHEATSTONE" with --WHEASTONE--.

Item (73), replace "a l'Energie" with --a L'Energie--.

In column 1, line 4 in the title, replace "WHEATSTONE" with --WHEASTONE--.

Signed and Sealed this

Third Day of August, 2010

David J. Kappos
*Director of the United States Patent and Trademark Office*